(12) United States Patent
Iwata

(10) Patent No.: US 11,022,463 B2
(45) Date of Patent: Jun. 1, 2021

(54) POSITION SENSOR AND SHIFT LEVER DEVICE

(71) Applicant: KABUSHIKI KAISHA TOKAI RIKA DENKI SEISAKUSHO, Aichi (JP)

(72) Inventor: Masayoshi Iwata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 37 days.

(21) Appl. No.: 16/473,282

(22) PCT Filed: Nov. 7, 2017

(86) PCT No.: PCT/JP2017/040110
§ 371 (c)(1),
(2) Date: Jun. 25, 2019

(87) PCT Pub. No.: WO2018/123277
PCT Pub. Date: Jul. 5, 2018

(65) Prior Publication Data
US 2020/0003580 A1 Jan. 2, 2020

(30) Foreign Application Priority Data
Dec. 27, 2016 (JP) .............................. JP2016-254182

(51) Int. Cl.
*G01D 5/14* (2006.01)
*F16H 59/10* (2006.01)
(Continued)

(52) U.S. Cl.
CPC ........... *G01D 5/142* (2013.01); *F16H 59/105* (2013.01); *G05G 1/015* (2013.01); *G05G 1/04* (2013.01)

(58) Field of Classification Search
CPC .............................. G01D 5/142; G01D 5/145
See application file for complete search history.

(56) References Cited

U.S. PATENT DOCUMENTS

| 5,055,781 A | 10/1991 | Sakakibara et al. |
| 2008/0078604 A1 | 4/2008 | Ersoy et al. |

(Continued)

FOREIGN PATENT DOCUMENTS

| JP | 2-298815 | 12/1990 |
| JP | 2008-520484 | 6/2008 |
| JP | 2013-010481 | 1/2013 |

OTHER PUBLICATIONS

Official Communication issued in International Patent Application No. PCT/JP2017/040110, dated Dec. 12, 2017 (with English translation).

*Primary Examiner* — Reena Aurora
(74) *Attorney, Agent, or Firm* — Greenblum & Bernstein, P.L.C.

(57) ABSTRACT

A position sensor includes a magnet that generates a magnetic field, and a magnetic detector that is positioned opposing the magnet to detect an inclination of the magnetic field caused by the magnet. The magnet and the magnetic detector move relative to each other when an operation member is automatically or manually operated. The position sensor detects an operation position of the operation member based on a detection signal of the magnetic detector. The magnet includes two magnets positioned to oppose each other to generate the magnetic field as a parallel magnetic field at a rotation center of a support structure that forms operation axes of the operation member in multiple directions. The magnetic detector is arranged between the two magnets positioned opposing each other.

7 Claims, 4 Drawing Sheets

Perspective Cross-Sectional View

(51) Int. Cl.
*G05G 1/015* (2008.04)
*G05G 1/04* (2006.01)

(56) References Cited

U.S. PATENT DOCUMENTS

| | | | |
|---|---|---|---|
| 2013/0063133 A1* | 3/2013 | Iwata | F16H 59/105 |
| | | | 324/207.2 |
| 2015/0123652 A1* | 5/2015 | Hernandez-Oliver | ....................... |
| | | | G01D 5/145 |
| | | | 324/207.13 |
| 2019/0063951 A1* | 2/2019 | Lee | F16H 59/70 |

\* cited by examiner

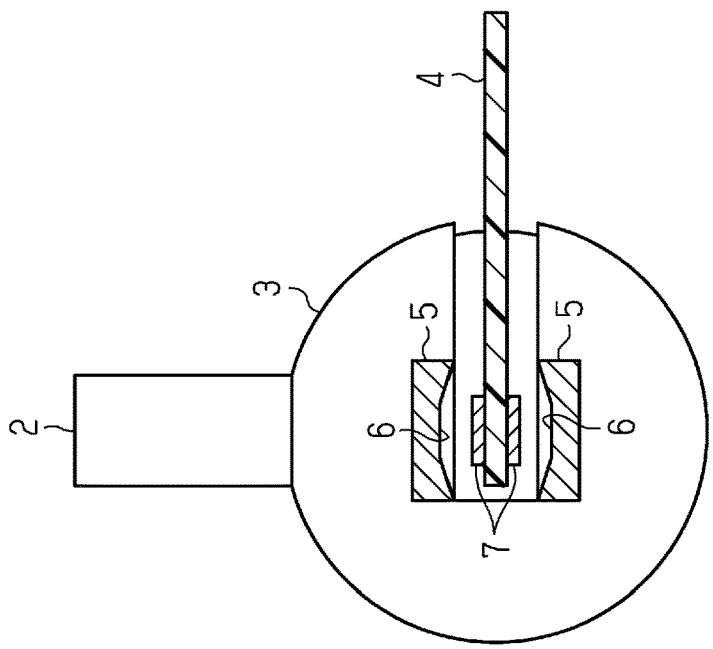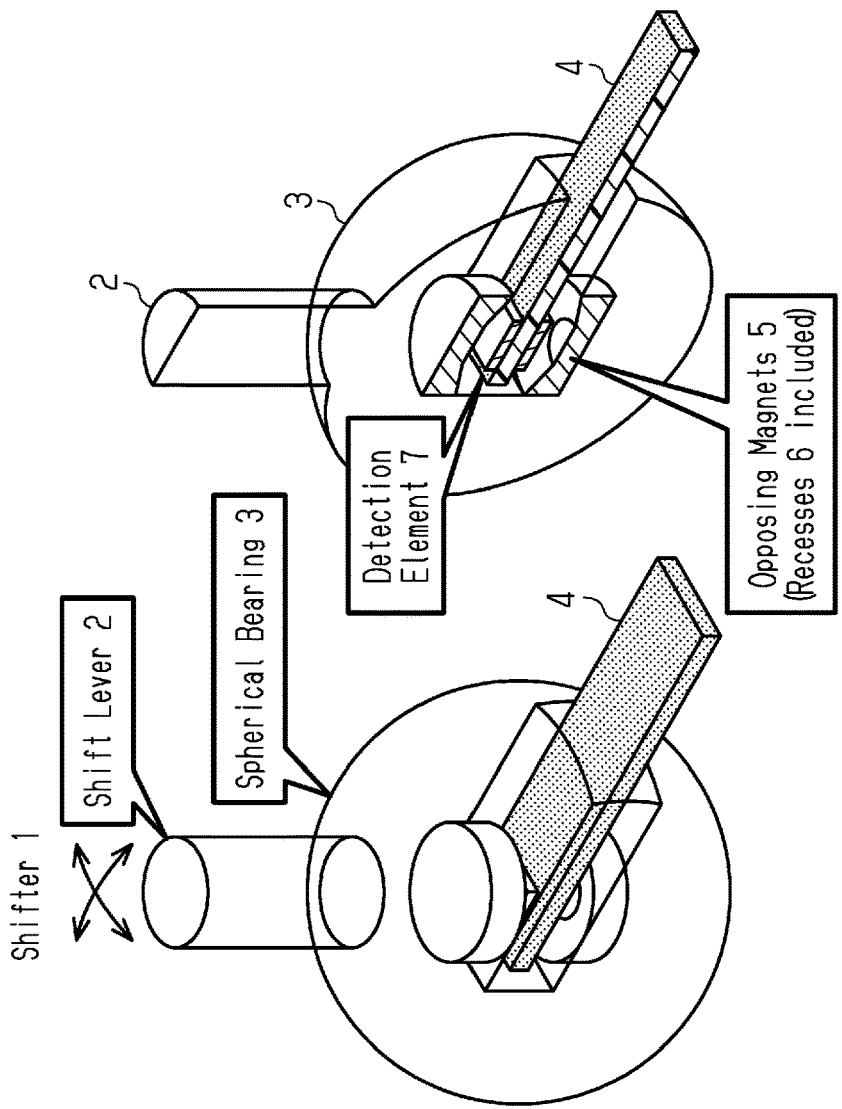

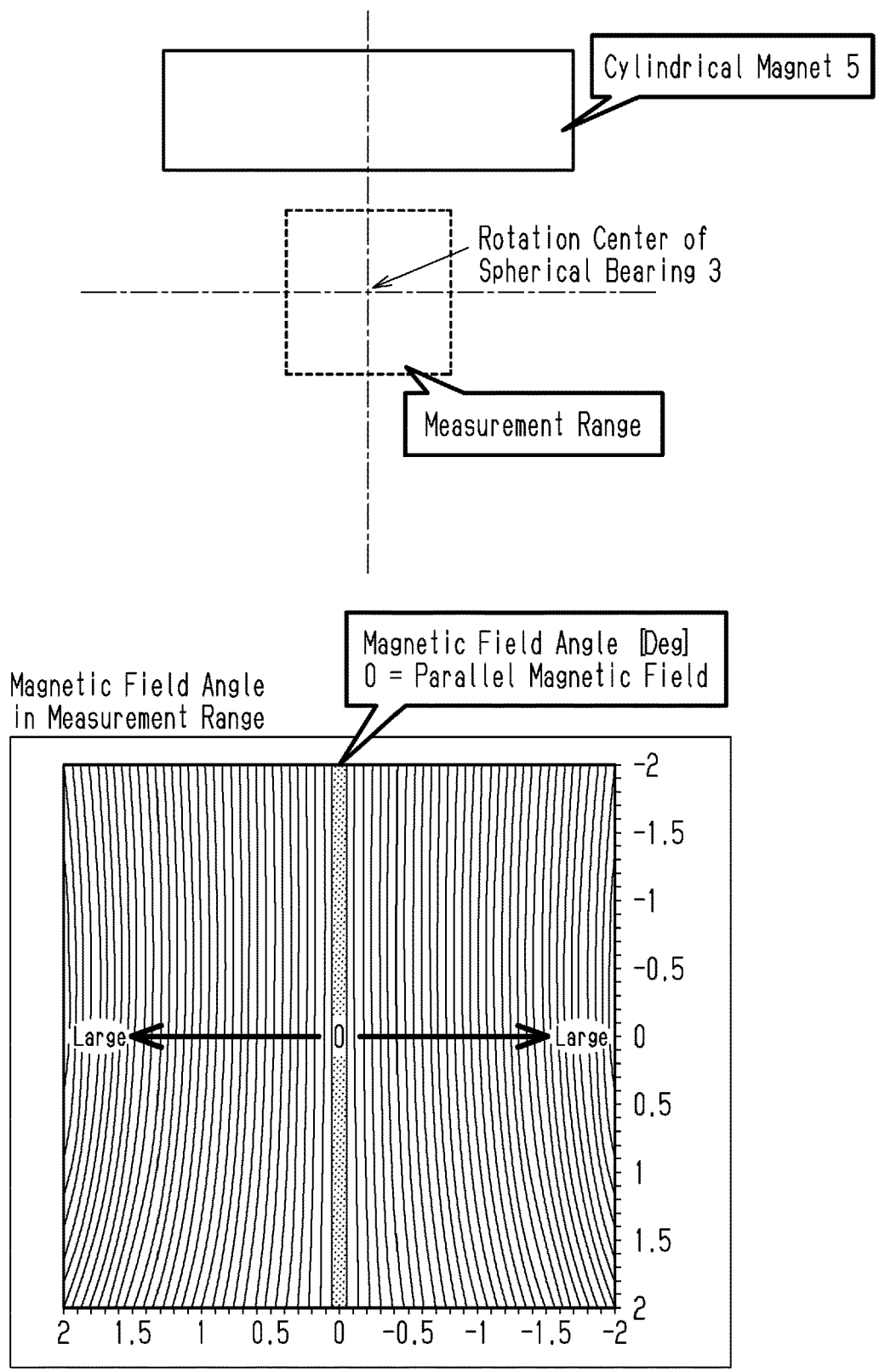
Fig.2 Case where magnets are not opposed to each other
Magnetic field not entirely parallel

Fig.3 Case where magnets are opposed to each other
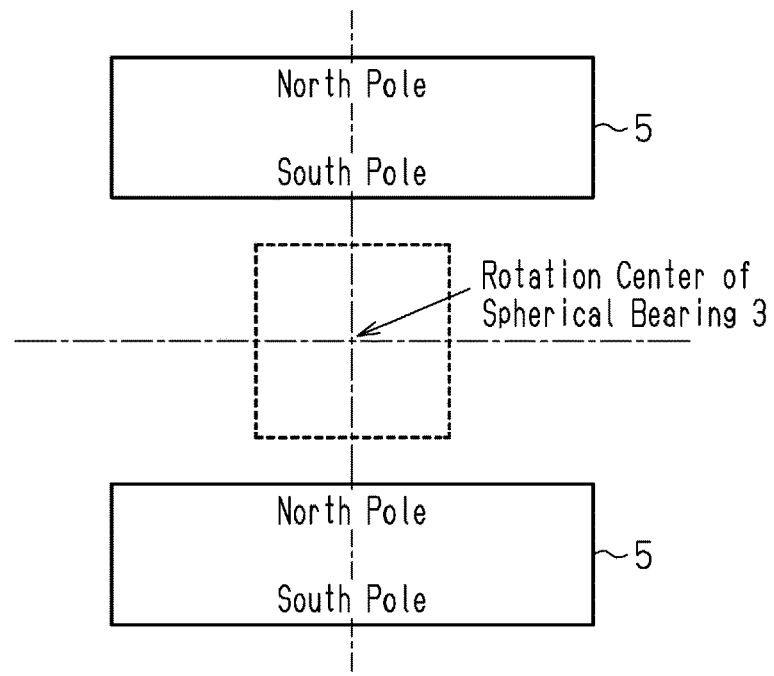
Magnetic Field Angle in Measurement Range
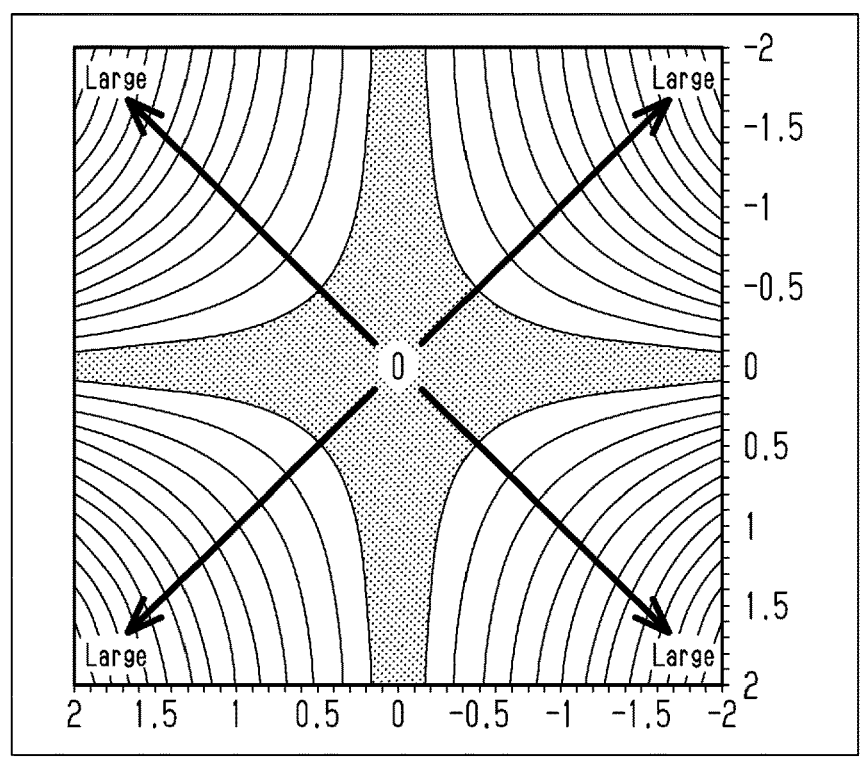
Magnetic field parallel in narrow range

Fig.4
Case where concave shape is formed
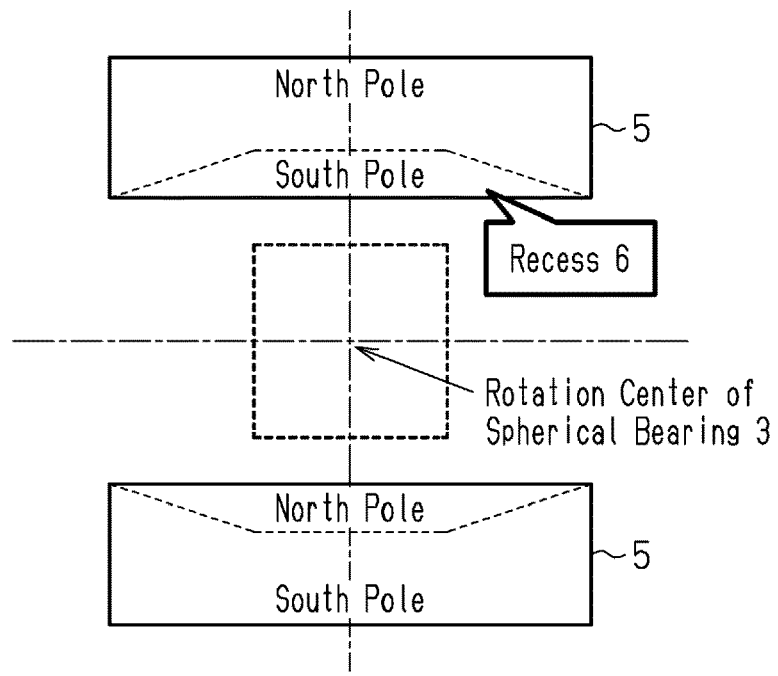
Magnetic Field Angle in Measurement Range
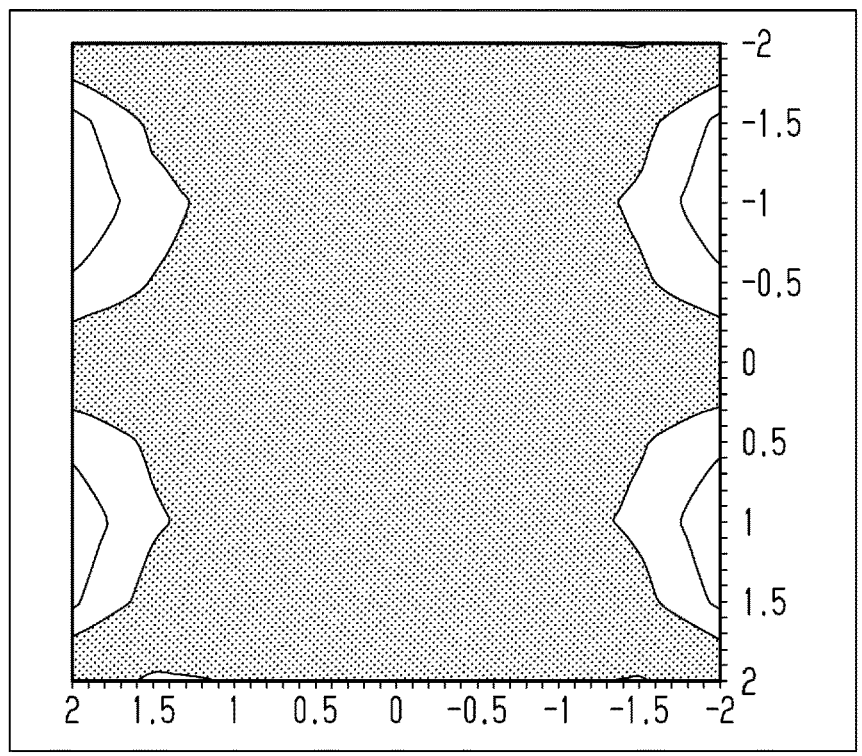
Magnetic field parallel in wide range

POSITION SENSOR AND SHIFT LEVER DEVICE

TECHNICAL FIELD

The present invention relates to a position sensor, which detects an operation position of an operation member using a magnet generating a magnetic field and a magnetic detector that detects an inclination of the magnetic field caused by the magnet, and a shift lever device including the position sensor.

BACKGROUND

Patent document 1 discloses a position sensor applied to a shifter that is operated to switch connection states of a vehicle transmission. The position sensor of patent document 1 includes a magnet and a magnetic detector. The magnet is provided on a joint ball fixed to a vehicle body, and the magnetic detector is provided on a housing including a spherical opening shaped in conformance with the joint ball. When a shift lever fixed to the housing is operated, the housing is pivoted about the joint ball, and an operation position of the shift lever is detected based on a detection signal of the magnetic detector.

Patent Document 1: Japanese National Phase Laid-Open Patent Publication No. 2008-520484

SUMMARY

As a result of the need for an ultra-compact shift-by-wire shifter of which the shift lever has an extremely small operation angle of 10° at most, changes in the shift lever inclination are required to be detected with high accuracy. Accordingly, improvements are needed to correctly distinguish an inclination of the shift lever from backlash resulting from play in the shift lever or the like.

One object of the present invention is to provide a position sensor and a shift lever device that improve the detection accuracy.

In one general aspect, a position sensor includes a magnet that generates a magnetic field and a magnetic detector that is positioned opposing the magnet to detect an inclination of the magnetic field caused by the magnet. The magnet and the magnetic detector move relative to each other when an operation member is automatically or manually operated. The position sensor detects an operation position of the operation member based on a detection signal of the magnetic detector. The magnet includes two magnets positioned to oppose each other to generate the magnetic field as a parallel magnetic field at a rotation center of a support structure that forms operation axes of the operation member in multiple directions. The magnetic detector is arranged between the two magnets positioned opposing each other.

This structure generates the parallel magnetic field at the rotation center of the support structure. Thus, the position sensor is not affected by the occurrence of backlash in the support structure, and robustness is increased. This improves the detection accuracy.

In the above position sensor, the two magnets positioned opposing each other may each be shaped to be concave to widen a range of the parallel magnetic field.

This structure generates the parallel magnetic field over a wide range. Thus, the position sensor is not affected even when the magnetic detectors are located above and below a substrate. This allows for redundancy to be easily obtained.

In the above position sensor, the two magnets may be positioned so that the concave shapes of the two magnets are plane-symmetric with respect to a plane including the rotation center of the support structure.

The design of the concave arrangement generates the parallel magnetic field over a wide range lying on the rotation center of the support structure.

In the above position sensor, the concave shape may extend entirely over an opposing surface of each of the two magnets positioned opposing each other.

This structure generates the parallel magnetic field over a wider range extending from the rotation center of the support structure on the opposing surfaces of the two magnets.

In the above position sensor, the magnetic detector may be located at a central position between the two magnets.

In this structure, the magnetic detector is arranged at a position where the parallel magnetic field is most easily generated. This improves the detection accuracy.

In the above position sensor, the magnetic detector may be located above and below a substrate arranged at a central position between the two magnets.

This structure concentrates a plurality of magnetic detectors at a location where the parallel magnetic field is most easily generated. Thus, redundancy is easily obtained.

In another general aspect, A shift lever device includes a shift lever and a position sensor. The shift lever serves as an operation member operated in multiple directions. The position sensor includes a magnet that generates a magnetic field and a magnetic detector that is positioned opposing the magnet to detect an inclination of the magnetic field caused by the magnet. The magnet and the magnetic detector move relative to each other when the operation member is automatically or manually operated. The position sensor detects an operation position of the operation member based on a detection signal of the magnetic detector. The magnet includes two magnets positioned to oppose each other to generate the magnetic field as a parallel magnetic field at a rotation center of a support structure that forms operation axes of the operation member in multiple directions. The magnetic detector is arranged between the two magnets positioned opposing each other.

This structure generates the parallel magnetic field at the rotation center of the support structure. Thus, the shift lever device is not affected by the occurrence of backlash in the support structure, and robustness is increased. This improves the detection accuracy.

The present invention improves the detection accuracy.

BRIEF DESCRIPTION OF THE DRAWINGS

FIG. 1A is a perspective view of a sensor.

FIG. 1B is a perspective cross-sectional view of the sensor.

FIG. 1C is a front cross-sectional view of the sensor.

FIG. 2 is a distribution chart of a magnetic field angle in a measurement range when magnets are not opposed to each other.

FIG. 3 is a distribution chart of the magnetic field angle in the measurement range when magnets are opposed to each other.

FIG. 4 is a distribution chart of the magnetic field angle in the measurement range when shaped to be concave.

DESCRIPTION OF THE EMBODIMENTS

One embodiment of a position sensor and a shift lever device will now be described. The position sensor in the present example is applied to a joystick type ultra-compact shifter.

As illustrated in FIGS. 1A to 1C, a shifter 1, which is one example of a shift lever device, includes a shift lever 2 (operation member) operated by a user and a spherical bearing 3 (ball joint as one example of support structure) that are integrated together. The spherical bearing 3 is supported by a housing (not illustrated) pivotally about the center of the spherical bearing 3 serving as a rotation center. The housing has a spherical opening shaped in conformance with the spherical bearing 3. Further, the housing includes a gate that guides the shift lever 2. The shift lever 2 is configured to be inclined along the gate by approximately 10° at most.

For example, operation of the shift lever 2 along the gate is permitted in a shift direction and a select direction. The shift direction corresponds to a vehicle front-rear direction (when shifter is of floor type) or a vehicle up-down direction (when shifter is of column type). The select direction corresponds to vehicle widthwise direction (in both floor type shifter and column type shifter). Permitted operations in the shift direction include an operation along a first line and an operation in a second line that is parallel to the first line. Three operation positions are arranged on the first line, namely, a reverse (R) position, a neutral (N) position, and a drive (D) position. Further, two operation positions are arranged on the second line, namely, a home (H) position and a regenerative brake (B). A commercialized shifting pattern includes an h-shaped pattern that includes the neutral (N) position arranged at the left side in the select direction extending from the home (H) position. However, the shifting pattern is not limited to such a pattern.

The spherical bearing 3 includes an open space having a certain size that extends from an opening formed in part of the surface of the spherical bearing 3 to a location beyond the rotation center of the spherical bearing 3. A substrate 4 is inserted into the open space so that a section from an edge to an intermediate portion of the substrate 4 is constantly in a state of non-contact with the spherical bearing 3. The substrate 4 is fixed to the housing.

The spherical bearing 3 includes two magnets 5 that are insert-molded to oppose each other and sandwich the rotation center. The two magnets 5 are both substantially cylindrical and include recesses 6 (shaped to be concave). The recesses 6 (shaped to be concave) oppose each other and each has a substantially trapezoidal front cross-section. The recesses 6 are positioned to be plane-symmetric with respect to a plane including the rotation center of the spherical bearing 3. Each of the recesses 6 extends entirely over an opposing surface of the corresponding one of the two opposing magnets 5. Instead of being insert-molded, the magnets 5 may be retrofitted by being fixed to the spherical bearing 3 or inserted into the spherical bearing 3.

The substrate 4 is arranged along the plane including the rotation center of the spherical bearing 3. A detection element 7 (magnetic detector) is mounted on each of the upper and lower surfaces of the substrate 4 so that the rotation center of the spherical bearing 3 is located between the two detection elements 7. When the two detection elements 7 are viewed as a single magnetic detector, the magnetic detector is located at a central position between the two magnets 5. If the shift lever 2 is the shifter 1 operated in the shift direction and the select direction, a three-axis sensor such as a three-dimensional Hall sensor may be employed as the detection element 7.

When the spherical bearing 3 is rotated in cooperation with an operation of the shift lever 2, each detection element 7 outputs a detection signal corresponding to an inclination of the magnetic field caused by the two magnets 5. The operation position of the shift lever 2 is detected based on the detection signal of one of the detection elements 7. Further, the detection signal of the other detection element 7 is used when the former detection element 7 fails. This obtains redundancy.

In order to obtain redundancy, the detection element 7 may have a triple-level system with two detection elements 7 mounted on the upper surface of the substrate 4 and another detection element 7 mounted on the lower surface. Alternatively, the detection element 7 may have a quadruple-level system. As another option, a plurality of detection elements 7 may be mounted on only one surface (e.g. upper surface) of the substrate 4 to obtain redundancy. When the detection elements 7 are mounted on a single surface, the detection elements 7 are arranged on the plane including the rotation center of the spherical bearing 3. However, a non-redundant configuration may also be employed in which one detection element 7 is mounted on a single surface of the substrate 4. In this case, the detection element 7 is arranged at the rotation center of the spherical bearing 3.

The operation of the position sensor applied to the shifter 1 will now be described.

As illustrated in FIG. 2, when the magnets 5 are not opposed each other in a case differing from the present example, a magnetic field angle increases as the rotation center of the spherical bearing 3 moves farther in the horizontal direction. In this case, the magnetic field is not entirely parallel, and the magnetic field angle exceeds 0.5 [Deg] even at positions that are only slightly separated in the horizontal direction from the rotation center of the spherical bearing 3. Thus, regardless of where the detection element 7 is located in the measurement range, the position sensor will be affected by backlash of the spherical bearing 3. As a result, the inclination of the shift lever 2 cannot be correctly distinguished from backlash of the spherical bearing 3.

As illustrated in FIG. 3, when the two magnets 5 are opposed to each other in the same manner as the present example, a parallel magnetic field, of which the magnetic field angle is 0 to 0.5 [Deg], exists in a range near the rotation center of the spherical bearing 3. Further, the magnetic field angle increases as the rotation center of the spherical bearing 3 moves farther in a radial direction. In this case, even though the detection elements 7 are positioned at the rotation center of the spherical bearing 3, the position sensor will not be affected by backlash of the spherical bearing 3 because the detection elements 7 are located in the range of the parallel magnetic field even though it is narrow. Thus, an inclination of the shift lever 2 can be correctly distinguished from backlash of the spherical bearing 3. In a case that differs from the present example, a single detection element 7 may be positioned at the rotation center of the spherical bearing 3.

As illustrated in FIG. 4, when the two magnets 5 are opposed to each other in the same manner as the present example and are each shaped to be concave, the parallel magnetic field extends over substantially the entire measurement range. In this case, even when the two detection elements 7 are positioned at opposite sides of the rotation center of the spherical bearing 3, the position sensor will not be affected by backlash of the spherical bearing 3 because the parallel magnetic field extends over a wide range. Thus, an inclination of the shift lever 2 can be correctly distinguished from backlash of the spherical bearing 3. This obtains redundancy.

The above embodiment has the advantages described below.

(1) With reference to FIG. 3, when the two magnets 5 are opposed to each other, the parallel magnetic field is generated at the rotation center of the spherical bearing 3. Thus, even when backlash of the spherical bearing 3 occurs, the position sensor is not affected, and robustness is increased. This improves the detection accuracy.

(2) With reference to FIG. 4, when each of the two opposing magnets 5 includes the recess 6 that is shaped to be concave, the parallel magnetic field is generated over a wide range. Thus, the position sensor is not affected even when the magnets are positioned above and below the substrate 4. This obtains redundancy.

(3) The concave arrangement of the recesses 6 is designed so that the recesses 6 of the two magnets 5 are plane-symmetric with respect to the plane including the rotation center of the spherical bearing 3. The design of the concave arrangement generates the parallel magnetic field over a wide range including the rotation center of the spherical bearing 3.

(4) With reference to FIG. 4, when each of the two opposing magnets 5 includes the recess 6 extending entirely over its opposing surface, the parallel magnetic field can be generated over a wider range extending from the rotation center of the spherical bearing 3 within the area of the opposing surfaces of the two magnets 5.

(5) With reference to FIG. 3, when the detection element 7 is arranged at a position where the parallel magnetic field is most easily generated such as the central position between the two magnets 5, the detection accuracy is improved.

(6) With reference to FIG. 1C, redundancy is obtained when the plurality of the detection elements 7 are concentrated at a position where the parallel magnetic field is most easily generated, such as when the detection elements 7 are located above and below the substrate 4 arranged at the central position between the two magnets 5.

(7) When the opposing magnets 5 are simple cylinders and are not concave, the diameter of the magnets 5 needs to be large to generate the parallel magnetic field over a wide range. However, when the opposing magnets 5 are concave in the same manner as the present example, the parallel magnetic field can be generated over a wide range even if the magnets 5 have a small diameter. Therefore, the position sensor in the present example is desirable as a position sensor applied to the ultra-compact shifter 1.

The present embodiment may be modified as described below.

The concave shape of the two opposing magnets 5 does not have to be substantially trapezoidal in a front cross-section. The concave shape may have a different shape that is determined through simulations to generate the parallel magnetic field over a desired wide range. Further, the shape of the magnets 5 may be designed so that the strength is not decreased by the concave shape.

The manner in which the magnets 5 and the detection elements 7 move relative to each other in accordance with an operation of the shift lever 2 is not limited to the description in the above embodiment in which the magnets 5 are movable and the detection elements 7 are fixed. Instead, the detection elements 7 may be movable and the magnets 5 may be fixed. Further, the magnets 5 and the detection elements 7 may both be movable. For example, the magnets 5 and the detection elements 7 may be moved in the same direction by different amounts. Alternatively, the magnets 5 and the detection elements 7 may move in different directions.

Instead of the support structure with multiple axes such as the spherical bearing 3 that forms operation axes in multiple directions relative to the shift lever 2 (shift direction and select direction of above embodiment), the position sensor in the present invention may be applied to a shifter including a first support structure and a second support structure. The first support structure forms an operation axis (shifting axis) in the shift direction, and the second support structure forms an operation axis (selection axis) in the select direction. That is, the support structure with multiple axes is not limited to the spherical bearing 3 (ball joint). In this case, the shifting axis and the selection axis intersect at the rotation center of the support structure.

The position sensor in the present invention may be applied to a game console or various operation devices in addition to the shifter 1. The present invention may be applied to a position sensor that detects an operation position of an operation member automatically operated in the same manner as an electric mirror in addition to a position sensor that detects an operation position of an operation member that is manually operated in the same manner as the shift lever 2. For example, the position sensor in the present invention can be applied to position detection such as a detection of a vehicle mirror inclination.

What is claimed is:

1. A position sensor, comprising:
    a magnet that generates a magnetic field; and
    a magnetic detector that is positioned opposing the magnet to detect an inclination of the magnetic field caused by the magnet, wherein
    the magnet and the magnetic detector move relative to each other when an operation member is automatically or manually operated,
    the position sensor detects an operation position of the operation member based on a detection signal of the magnetic detector,
    the magnet includes two magnets positioned to oppose each other to generate the magnetic field as a parallel magnetic field at a rotation center of a support structure that forms operation axes of the operation member in a shift direction and a select direction that intersects the shift direction, and
    the magnetic detector is a three-axis sensor and arranged between the two magnets positioned opposing each other.

2. The position sensor according to claim 1, wherein the two magnets positioned opposing each other are each shaped to be concave to widen a range of the parallel magnetic field.

3. The position sensor according to claim 2, wherein the two magnets are positioned so that the concave shapes of the two magnets are plane-symmetric with respect to a plane including the rotation center of the support structure.

4. The position sensor according to claim 2, wherein the concave shape extends entirely over an opposing surface of each of the two magnets positioned opposing each other.

5. The position sensor according to claim 1, wherein the magnetic detector is located at a central position between the two magnets.

6. The position sensor according to claim 1, wherein the magnetic detector is located above and below a substrate arranged at a central position between the two magnets.

7. A shift lever device, comprising:
    a shift lever serving as an operation member operated in multiple directions; and
    a position sensor including a magnet that generates a magnetic field and a magnetic detector that is positioned opposing the magnet to detect an inclination of the magnetic field caused by the magnet, wherein the magnet and the magnetic detector move relative to each other when the operation member is automatically or manually operated, and the position sensor detects an operation position of the operation member based on a detection signal of the magnetic detector, wherein the magnet includes two magnets positioned to oppose each other to generate the magnetic field as a parallel magnetic field at a rotation center of a support structure that forms operation axes of the operation member in a shift direction and a select direction that intersects the shift direction, and the magnetic detector is a three-axis sensor and arranged between the two magnets positioned opposing each other.

* * * * *